US010764514B1

(12) United States Patent
Hoevenaar et al.

(10) Patent No.: US 10,764,514 B1
(45) Date of Patent: Sep. 1, 2020

(54) GAIN SWITCHING TECHNIQUES FOR THERMAL CAMERAS

(71) Applicant: Snap-on Incorporated, Kenosha, WI (US)

(72) Inventors: Robert Hoevenaar, De Weere (NL); Timothy G. Ruther, Carpentersville, IL (US); Oswaldo Neri, Los Banos, CA (US)

(73) Assignee: Snap-on Incorporated, Kenosha, WI (US)

( * ) Notice: Subject to any disclaimer, the term of this patent is extended or adjusted under 35 U.S.C. 154(b) by 102 days.

(21) Appl. No.: 16/020,867

(22) Filed: Jun. 27, 2018

(51) Int. Cl.
*H04N 5/33* (2006.01)
*H04N 5/243* (2006.01)
*G06T 7/11* (2017.01)
*H04N 5/232* (2006.01)

(52) U.S. Cl.
CPC ............. *H04N 5/33* (2013.01); *G06T 7/11* (2017.01); *H04N 5/23245* (2013.01); *H04N 5/23293* (2013.01); *H04N 5/243* (2013.01); *G06T 2207/10048* (2013.01); *G06T 2207/20104* (2013.01)

(58) Field of Classification Search
CPC ....................................................... H04N 5/33
USPC ....................................................... 348/164
See application file for complete search history.

(56) References Cited

U.S. PATENT DOCUMENTS 9,616,568 B1 4/2017 Russell
9,971,792 B2 5/2018 Solli
2002/0065844 A1 5/2002 Robinson et al.
2008/0099678 A1 5/2008 Johnson et al.
2009/0172129 A1 7/2009 Singh et al.
2013/0110344 A1 5/2013 Merg et al.
2014/0164349 A1 6/2014 Cudak et al.
2014/0247365 A1 9/2014 Gardner et al.
2014/0267633 A1 9/2014 Venkataraman et al.
2015/0022667 A1 1/2015 McManus et al.
(Continued)

FOREIGN PATENT DOCUMENTS

WO 2014/100787 A1 6/2014

OTHER PUBLICATIONS

Avisynth Wiki; FAQ YV12; Apr. 7, 2016.
(Continued)

*Primary Examiner* — Eileen M Adams
*Assistant Examiner* — Daniel T Tekle
(74) *Attorney, Agent, or Firm* — McDonnell Boehnen Hulbert & Berghoff LLP

(57) ABSTRACT

Described herein are systems and computer-implemented methods for controlling a gain state of a thermal camera. According to an example method, a processor can obtain, from a thermal camera, temperature readings for respective pixels of a plurality of pixels of an image captured by the thermal camera, and the processor can determine respective weights for the temperature readings using a weight function. The method can also involve the processor determining a weighted average of the temperature readings using the temperature readings and the respective weights for the temperature readings. Further, the method can involve the processor determining based at least on the weighted average, a gain state for the thermal camera, and the processor causing the thermal camera to operate in the gain state.

22 Claims, 8 Drawing Sheets

(56) References Cited

U.S. PATENT DOCUMENTS

| | | | |
|---|---|---|---|
| 2015/0098663 A1* | 4/2015 | Heinke | H04N 5/23216 382/284 |
| 2016/0041039 A1 | 2/2016 | Olsson | |
| 2016/0364629 A1 | 12/2016 | Solli | |
| 2018/0239784 A1 | 8/2018 | Solli et al. | |
| 2018/0338082 A1 | 11/2018 | Baqai et al. | |

OTHER PUBLICATIONS

Sullivan, Gary and Estrop, Stephen; Recommended 8-Bit YUV Formats for Video Rendering; Nov. 2008.
NXP Semiconductors Inc.; i.MX 7Solo Applications Processor Reference Manual; Aug. 2016 (submitted via five PDF files).
FLIR Systems, Inc.; User's manual FLIR GF3xx series; T559157; Oct. 23, 2017.
Snap-On Incorporated; Diagnostic Thermal Imager, User Manual; ZEETH3006 Rev. A 6-K-16 Nagbau; Oct. 2016.
FLIR Systems, Inc.; FLIR Systems introduces Multi Spectral Dynamic Imaging (MSX); Innovative feature for extremely detail rich thermal images; downloaded from the world wide web at http://www.flir.co.uk/cs/display/?d=56012 on Apr. 30, 2018.
Fluke Corporation; Development Insider; How patent-pending technology blends thermal and visible light; Oct. 2006.
Segger Microcontroller GmbH & Co. KG; emWin; Graphic Library with Graphical User Interface; User & Reference Guide; Document UM03001; Mar. 6, 2017.
Navico Holdings AS; Lowrance; HDS Gen3; Operator Manual; Apr. 25, 2017.
FLIR Systems, Inc.; FLIR C3; Dec. 29, 2016.
FLIR Systems, Inc, User's manual FLIR Cx series; Publication T559918; May 2, 2017.
Fluke Corporation; SmartView 3.2.1; Feb. 22, 2012.
Fluke Corporation; Fluke SmartView IR analysis and reporting software; Aug. 2007.
Fluke Corporation; Technical Data; Fluke Connect SmartView Desktop software; Apr. 2017.
U.S. Appl. No. 16/020,970, filed Jun. 27, 2018, inventors: Robert Hoevenaar, Joshua C. Covington, Oswaldo Neri, Roy S. Brozovich, Timothy G. Ruther, and Michael D. LaFerle.
U.S. Appl. No. 16/020,694, filed Jun. 27, 2018, inventors: Robert Hoevenaar and Timothy G. Ruther.
U.S. Appl. No. 16/020,976, filed Jun. 27, 2018, inventors: Joshua C. Covington, Oswaldo Neri, Roy S. Brozovich, Timothy G. Ruther, and Michael D. LaFerle.
FLIR Muon, FLIR Systems, 5 pages, http://www.flir.co.uk/, Apr. 16, 2018.
Flir Exx-Series, Advanced Thermal Imaging, 7 pp., www.flir.com, Mar. 7, 2018.
FLIR, Lepton Engineering Datasheet, 74 pages, Document No. 500-0763-01-09 Rev 110, Dec. 7, 2016.
FLIR Systems AB; GenICam ICD FLIR AX5 Camera—PC; Jul. 3, 2014.
FLIR Systems, Inc.; FLIR Lepton 80 x 60 Radiometric Longwave Infrared (LWIR) Camera Module; Jun. 19, 2017.
Security Electronics and Networks; FLIR Develops Muon Thermal Imaging Camera Core for OEMs; Sep. 10, 2014.
IR Tools, Master your thermal camera's Automatic Gain Control (AGS), Mar. 27, 2015.
Fluke Corporation, Thermal imaging terminology—explained, Jul. 2009.
FLIR Systems AB; FLIR One, User Guide second generation for Apple iOS, Nov. 9, 2015.
Jimenez, Castro et al.; "Thermal Image Sensing Model for Robotic Planning and Search", (U.S. Appl. No. 14/248,220), filed Aug. 2016, vol. 16, Issue 8, Abstract, 1 page.
Kumar, Mathan B. et al.; "Multiple kernel scale invariant feature transform and cross indexing for image search and retrieval", Mar. 2018, vol. 66, Issue 2, Abstract, 1 page.
Matteoli, Sara et al.; "A novel image processing procedure for thermographic image analysis", Medical & Biological Engineering & Computing, Oct. 2018, vol. 56, Issue 10, Abstract, 1 page.
Azari, Milad Niaz et al.; "Intelligent Fault Detection in Power Distribution Systems Using Thermos-grams by Ensemble Classifiers", Automatika: Journal for Control, Measurement, Electronics, Computing & Communications, Oct.-Dec. 2016, vol. 57, Issue 4, Abstract, 1 page.
USPTO Patent Applications Database; abstract of U.S. Appl. No. 15/960,453; title: Image retrieval and processing systems and methods; applicant: FLIR Systems AB; inventors; Martin Solli and Stefan Bergstrom; published on Aug. 23, 2018, 1 page.
De Oliveira, Duilhio Candido et al.; "Using Deep Learning and Low-Cost RGB and Thermal Cameras to Detect Pedestrians in Aerial Images Captured by Multirotor UAV", (U.S. Appl. No. 14/248,220) filed Jul. 1, 2018, vol. 18, Issue 7, abstract., 2 pages.
Marell, James et al.; "A comparison of image inspection modes for a visual search and rescue task", Behaviour & Information Technology, Sep. 2014, vol. 33, Issue 9, abstract, 1 page.
Wang, Z. et al.; "Stream Line-Based Pattern Search in Flows", Computer Graphics Forum, Dec. 2017, vol. 36, Issue 8, abstract, 1 page.
USPTO Patent Applications Database; abstract of U.S. Pat. No. 9,971,792; title: Image retrieval and processing systems and methods; applicant: FLIR Systems AB; inventor: Martin Solli; filed Jun. 9, 2016, issued May 15, 2018, 1 page.
Raza, Shan-E-Ahmed et al.; "Automatic Detection of Diseased Tomato Plants Using Thermal and Stereo Visible Light Images", M. PLos One, Apr. 2015, vol. 10, Issue 4, abstract, 1 page.
Barcelos, Emilio Z. et al.; "A Combined Method for segmentation and registration for an advance and progressive evaluation of thermal images", Sensors (U.S. Appl. No. 14/248,220) 2014, vol. 14, Issue 11, abstract, 1 page.
Basurto, Chantal et al.; "Multi-criteria analysis for the integrated performance assessment of complex fenestration systems", Building Research & Information, Nov. 2017, vol. 45, Issue 8, abstract, 1 page.
Riaz, Irfan et al.; "Human Detection by Using Centrist Features for Thermal Images", IADIS International Journal on Computer Science & Information Systems, 2013, vol. 8, Issue 2, abstract., 1 page.
Lin, Dong et al "Automatic Spatio-Temporal Flow Velocity Measurement in Small Rivers Using Thermal Image Sequences", ISPRS Annals of Photogrammetry, Remote Sensing & Spatial Information Sciences, 2018, vol. 4, Issue 2, Publisher: Copernicus Gesellschaft mbH; abstract, 1 page.
Kremis, I.I. et al.; "Scanning Thermal Imaging Device Based on a Domestic Photodetector Device", Journal of Communications Technology and Electronics, Mar. 2018, vol. 63, Issue 3, abstract, 1 page.
Trivedi, Indraji N. et al.; "An economic load dispatch and multiple environmental dispatch problem solution with microgrids using interior search algorithm", Neural Computing & Applications, Oct. 2018, vol. 30, Issue 7, abstract, 1 page.
Chaudhry, F.A. et al.; "A novel chaotic differential evolution hybridized with quadratic programming for short-term hydrothermal coordination", Neural Computing & Applications, Dec. 2018, vol. 30, Issue 11, abstract, 1 page.
USPTO Patent Applications Database; abstract of U.S. Pat. No. 9,616,568; title: Generating a grasp affordance for an object based on a thermal image of the object that is captured following human manipulation of the object; applicant: X Development LLC; inventor: Jared Stephan Russell; issued Apr. 11, 2017, abstract, 1 page.
Kong, Seong et al.; "Multiscale Fusion of Visible and Thermal IR Images for Illumination-Invariant Face Recognition", International Journal of Computer Vision, Feb. 2007, vol. 71, Issue 2, abstract, 1 page.
Oettershagen, Philipp et al.; "Robotic technologies for solar-powered UAVs: Fully autonomous updraft-aware aerial sensing for multiday search-and-rescue missions", Journal of Field Robotics, Jun. 2018, vol. 35, Issue 4, abstract, 1 page.
Jamrozik, Wojciech et al.; "Application of fused visual and thermal images in monitoring and evaluation of welding processes", Welding International, Jun. 2015, vol. 29, Issue 6, abstract, 1 page.

(56) References Cited

OTHER PUBLICATIONS

Liao, Qixiang et al.; "Parameter Estimation of Nonlinear Systems by Dynamic Cuckoo Search", Neural Computation, Apr. 2017, vol. 29, Issue 4, abstract, 1 page.

Hermosilla, Gabriel et al.; "Fusion of Visible and Thermal Descriptors Using Genetic Algorithms for Face Recognition Systems", Sensors (U.S. Appl. No. 14/248,220), filed Aug. 2015, vol. 15, Issue 8, abstract, 1 page.

Shunzhi, Zhu et al.; "Image feature detection algorithm based on the spread of Hessian source", Multimedia Systems, Feb. 2017, vol. 23, Issue 1, abstract, 1 page.

Zhu, J. et al.; "Interfacial Residual Stress Analysis of Thermal Spray Coatings by Miniature Ring-Core Cutting Combined with DIC Method", Experimental Mechanics, Feb. 2014, vol. 54, Issue 2, abstract, 1 page.

USPTO Patent Applications Database; abstract of U.S. Appl. No. 15/178,513; title: image retrieval and processing systems and methods; applicant: FLIR Systems AB; inventor: Martin Solli; filed Jun. 9, 2016, 1 page.

Scott, Spencer M. et al.; "The thermal stability and consolidation of perovskite variant Cs2SnCl6 using spark plasma sintering", Journal of the American Ceramic Society; May 2018, vol. 101, Issue 5, abstract, 1 page.

Zhang, Hu et al.; "Theoretical accuracy of anisotropic thermal conductivity determined by transient plane source method", International Journal of Heat and Mass Transfer; May 2017, 108 Part B; abstract, 1 page.

Valdramidis, Vasilis P. et al.; "Novel Thermal and Non-Thermal Technologies for Fluid Foods"; Food Science and Technology, International Series Amsterdam: Academic Press, 2012, abstract 1 page.

Dupre, Jean-Christophe et al.; "Detection of cracks in refractory materials by an enhanced digital image correlation technique", Journal of Materials Science, Jan. 2018, vol. 53, Issue 2, abstract, 2 pages.

Jimenez, Castro et al.; "Thermal Image Sensing Model for Robotic Planning and Search", Sensors; published Aug. 8, 2016; vol. 16, 1253; doi 10.3390/s16081253; 27 pages.

\* cited by examiner

700

702

704

| MIN | MIN | MIN | MIN | MIN | MIN | MIN | MIN | MIN | MIN | MIN | MIN |
|---|---|---|---|---|---|---|---|---|---|---|---|
| MIN | MIN | MIN | MIN | MIN | MIN | MIN | MIN | MIN | MIN | MIN | MIN |
| MIN | MIN | MIN | 0.1 | 0.1 | 0.1 | MIN | MIN | MIN | MIN | MIN | MIN |
| MIN | MIN | 0.1 | 0.5 | 0.5 | 0.5 | 0.1 | 0.1 | MIN | MIN | MIN | MIN |
| MIN | MIN | 0.1 | 0.5 | 1 | 0.5 | 0.3 | 0.1 | MIN | MIN | MIN | MIN |
| MIN | MIN | 0.1 | 0.5 | 0.5 | 0.5 | 0.1 | MIN | MIN | MIN | MIN | MIN |
| MIN | MIN | 0.1 | 0.3 | 0.1 | 0.1 | 0.1 | MIN | MIN | MIN | MIN | MIN |
| MIN | MIN | MIN | 0.1 | MIN | MIN | MIN | MIN | MIN | MIN | MIN | MIN |
| MIN | MIN | MIN | MIN | MIN | MIN | MIN | MIN | MIN | MIN | MIN | MIN |
| MIN | MIN | MIN | MIN | MIN | MIN | MIN | MIN | MIN | MIN | MIN | MIN |
| MIN | MIN | MIN | MIN | MIN | MIN | MIN | MIN | MIN | MIN | MIN | MIN |
| MIN | MIN | MIN | MIN | MIN | MIN | MIN | MIN | MIN | MIN | MIN | MIN |

GAIN SWITCHING TECHNIQUES FOR THERMAL CAMERAS

BACKGROUND

Many manufactured products occasionally have to be repaired. Thermal cameras, also referred to as thermographic cameras or thermal imaging cameras, can be useful to repair such products. By way of example, a thermal camera can form an image of a portion of a vehicle using infrared radiation, similar to the manner in which a camera forms an image using visible light. An operator can use an image output by a thermal camera to detect and visualize areas of heat, which may help the operator analyze an irregularity in the vehicle's operation.

Some thermal cameras include multiple gain states. For instance, a thermal camera can be configured to operate in either a high-gain state or a low-gain state. The high-gain state may provide a first, high accuracy and support a narrow intra-scene range of temperatures, whereas, the low-gain state may provide a second, lower accuracy but support a higher intra-scene range of temperatures.

As a particular example, in a high-gain state, a thermal camera may have an accuracy of ±5° C. and an intra-scene range of about −10° C. to 140° C., and in a low-gain state, the thermal camera may have an accuracy of ±10° C. and an intra-scene range of about −10° C. to 450° C. When the thermal camera operates in the high-gain state and a scene imaged by the thermal camera includes temperatures above 140° C., those temperatures may saturate sensors of the thermal camera. To view the temperatures above 140° C., the thermal camera can be switched to the low-gain state, so that the temperatures above 140° C. may be more accurately quantified and visualized.

SUMMARY

In one example aspect, a system is described that includes a processor and a non-transitory computer-readable medium having stored therein instructions that, when executed by a processor, cause the processor to preform various functions. The functions include obtaining temperature readings for respective pixels of a plurality of pixels of an image captured by a thermal camera. The functions also include determining respective weights for the temperature readings using a weight function. The weight function assigns a weight to a given temperature reading for a given pixel based on a proximity of the given pixel to a maximum-weighted point, with the weight being inversely proportional to a distance between the given pixel and the maximum-weighted point. Additionally, the functions include determining a weighted average of the temperature readings using the temperature readings and the respective weights for the temperature readings. Further, the functions include determining, based at least on the weighted average, a gain state for the thermal camera, and causing the thermal camera to operate in the gain state.

In another example aspect, a computer-implemented method is described that involves obtaining, by a processor from a thermal camera, temperature readings for respective pixels of a plurality of pixels of an image captured by the thermal camera. The method also involves determining, by the processor, respective weights for the temperature readings using a weight function. The weight function assigns a weight to a given temperature reading for a given pixel based on a proximity of the given pixel to a maximum-weighted point, with the weight being inversely proportional to a distance between the given pixel and the maximum-weighted point. In addition, the method also involves determining, by the processor, a weighted average of the temperature readings using the temperature readings and the respective weights for the temperature readings. Further, the method involves determining, by the processor based at least on the weighted average, a gain state for the thermal camera, and causing, by the processor, the thermal camera to operate in the gain state.

In still another example aspect, a non-transitory computer-readable medium having stored therein instructions that, when executed by a processor, cause the processor to perform functions is described. The functions include obtaining temperature readings for respective pixels of a plurality of pixels of an image captured by a thermal camera. The functions also include determining respective weights for the temperature readings using a weight function. The weight function assigns a weight to a given temperature reading for a given pixel based on a proximity of the given pixel to a maximum-weighted point, with the weight being inversely proportional to a distance between the given pixel and the maximum-weighted point. Additionally, the functions include determining a weighted average of the temperature readings using the temperature readings and the respective weights for the temperature readings. Further, the functions include determining, based at least on the weighted average, a gain state for the thermal camera, and causing the thermal camera to operate in the gain state.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 7 is another conceptual illustration of example weights corresponding to pixels of an image.

FIG. 8 is another conceptual illustration of example weights corresponding to pixels of an image.

DETAILED DESCRIPTION

I. Introduction

Figure 1:
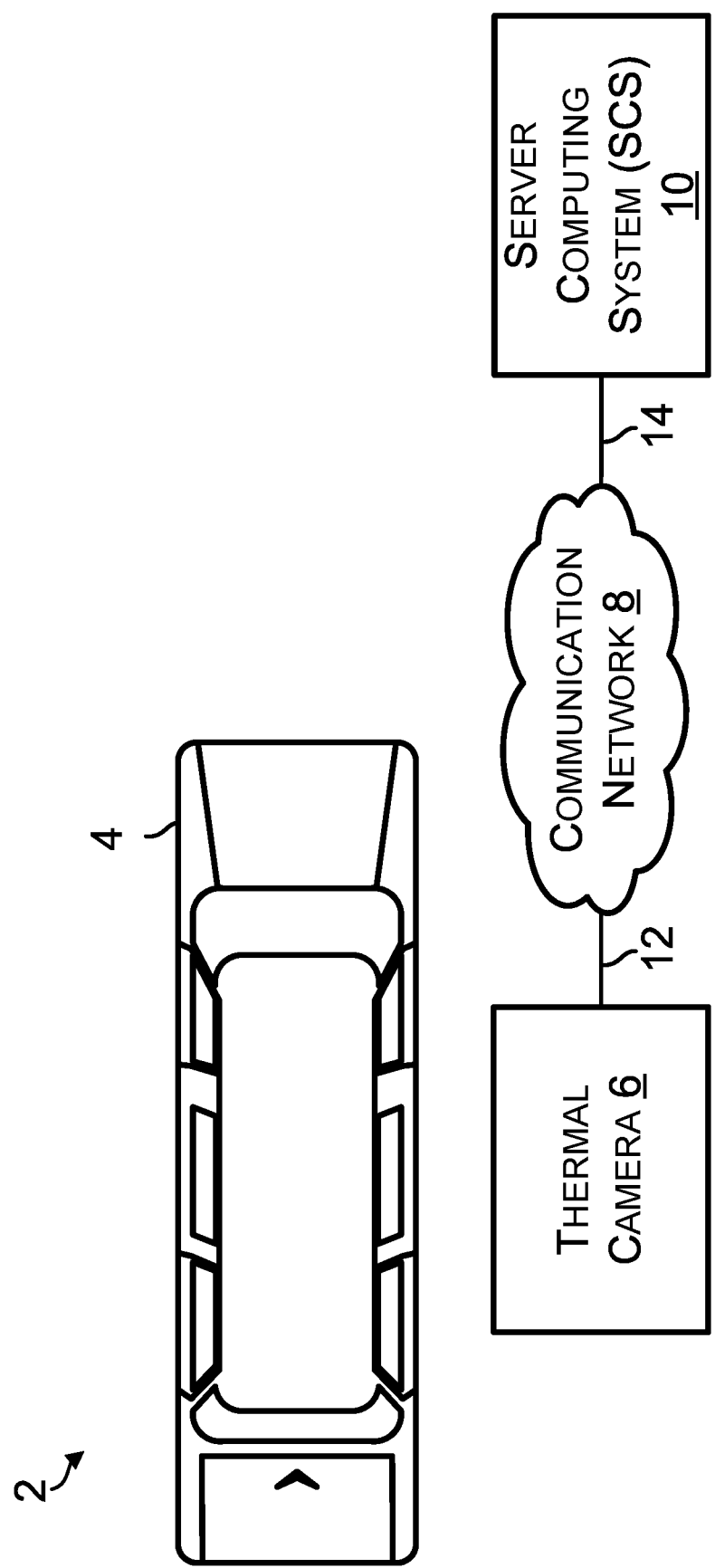
FIG. 1 is a block diagram of an example system.

Although many of the example embodiments below are described with respect to a vehicle, the example embodiments can be applicable to products or repairable items other than a vehicle. As an example, the other products or repairable items can include home appliances, such as a generator, a refrigerator, a dishwasher, or a washing machine, or consumer electronic devices, such as a television, a cellular phone, or a tablet device. Other examples of products or repairable items are also possible, such as a heating, ventilation, and air conditioning (HVAC) system. Similarly, the example embodiments can be applicable to structures, such as houses or buildings. Accordingly, for embodiments based on other products or repairable items or embodiments based on structures, the term vehicle in the described embodiments can be replaced with a name of the other product or repairable item or a name of a structure.

In this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements. For purpose of this description, the terms "multiple" and "a plurality of" refer to "two or more" or "more than one."

The block diagram(s) and flow chart(s) shown in the figures are provided merely as examples and are not intended to be limiting. Many of the elements illustrated in the figures or described herein are functional elements that can be implemented as discrete or distributed elements or in conjunction with other elements, and in any suitable combination and location. Those skilled in the art will appreciate that other arrangements and elements (e.g., machines, interfaces, functions, orders, or groupings of functions) can be used instead. Furthermore, various functions described as being performed by one or more elements of a machine described herein can be carried out by a processor executing computer-readable program instructions or by any combination of hardware, firmware, or software.

Described herein are, among other things, systems and computer-implemented methods for controlling a gain state of a thermal camera. In some instances, a system having at least one processor may determine a weighted average of temperature readings for pixels of an image captured by the thermal camera, and use the weighted average to determine a gain state for the thermal camera. For instance, the processor may determine that the weighted average satisfies a threshold condition and, based on the determination, cause the thermal camera to operate in a particular gain state. Causing the thermal camera to operate in the particular gain state can involve causing the thermal camera to transition from a first gain state to a second gain state.

In an example method, a processor can obtain, from a thermal camera, temperature readings for respective pixels of a plurality of pixels of an image captured by the thermal camera. The processor can then determine respective weights for the temperature readings using a weight function that assigns a weight to a given temperature reading for a given pixel based on a proximity of the given pixel to a maximum-weighted point. For instance, the weight function can assign weights to the respective temperature reading associated with each pixel, with the assigned weight decreasing as the distance between the pixel and the maximum-weighted point increases.

In some instances, the maximum-weighted point is a center pixel(s) of the plurality of pixels. Alternatively, the maximum-weighted point can be a center pixel(s) of a region of interest. The region of interest could include all of the plurality of pixels, in which case the center pixel(s) of the region of interest and the center pixel(s) of the plurality of pixels could be the same. Alternatively, the region of interest can be a subset of the plurality of pixels that does not include all of the plurality of pixels, in which case the center pixel(s) of the plurality of pixels could be the same as or different from the center pixel(s) of the region of interest. The weight assigned by the weight function could be a numerical value between a minimum number and a maximum number. For instance, the weight assigned by the weight function could be a numerical value between 0 and 1. The numerical value can be inclusive of the minimum number or the maximum number. Other examples are also contemplated.

Further, the processor can determine a weighted average of the temperature readings using the temperature readings and the respective weights for the temperature readings. For instance, the processor can determine the weighted average by multiplying the respective weights by the temperature readings, and then determining an average of the resulting products. The processor can then use the weighted average to determine a gain state for the thermal camera. As an example, the processor can determine that the weighted average satisfies a threshold condition (e.g., is a above a threshold temperature) and, based on the determination, determine a low-gain state as the gain state. Alternatively, the processor can determine that the weighted average satisfies a threshold condition (e.g., is below a threshold temperature) and, based on the determination, determine a high-gain state as the gain state.

Upon determining the gain state, the processor can cause the thermal camera to operate in the gain state. For instance, the processor can transmit a software command to a camera module of the thermal camera, with reception of the software command causing the thermal camera to operate in the gain state. Causing the thermal camera to operate in the gain state can involve causing the thermal camera to transition from operating in a high-gain state to operating in a low-gain state, or to transition from operating in a low-gain state to operating in a high-gain state. In some instances, the processor could cause the thermal camera to operate in the gain state upon determining that the gain state is different from a current gain state at which the thermal camera is operating. On the other hand, if the gain state and the current gain state are the same, a change to the gain state might not be required.

The systems and computer-implemented methods described herein provide advantages over conventional techniques for controlling a gain state of a thermal camera. For instance, some conventional thermal cameras include automatic gain control features that regulate the gain state of a thermal camera based on a fixed percentage of temperature readings for all pixels of an image captured by the thermal camera being above or below a threshold temperature (e.g., 25% of all 4800 pixels having a temperature reading above or below a threshold temperature). This approach is problematic when a thermal camera is operating in a high-gain state and only a few pixels of interest within an image have temperature readings above the threshold but other pixels around the few pixels have temperature readings below the threshold. The high-gain state may correspond to an intra-scene range, and the few pixels of interest may have temperature readings that are indicated to be the maximum temperature of the intra-scene range. In order for the automatic gain control feature to trigger the thermal camera to switch from the high-gain state to the low-gain state (so that the temperature readings for the pixels of interest can be more accurately quantified), an operator of the thermal camera must zoom in on the scene or move the thermal camera closer to the scene, thereby causing more pixels to have temperature readings above the threshold and triggering a switch to the low-gain state. In some instances, zooming-in on the scene could negatively affect the quality of the image captured by the thermal camera. In addition, moving a thermal camera closer to a scene could be dangerous. For instance, moving a thermal camera closer to a scene could expose an operator to dangerously-high temperatures or place the operator dangerously-close to a moving object(s).

In contrast, with the gain switching techniques disclosed herein, a few pixels (e.g., ten, twenty, or one hundred pixels) of interest having temperature readings above a threshold can be enough to trigger switching the gain state of the thermal camera to the low-gain state. For example, the few pixels may be located near (e.g., within five, ten, or twenty pixels of) or include a maximum-weighted point, such that the temperature readings for the few pixels are weighted more heavily and the temperature readings for the surrounding pixels have less of an effect on the determination of whether to switch gain states. In a configuration in which the maximum-weighted point is a center pixel, the operator can just adjust an orientation of the thermal camera so that: (i) a part of the scene exhibiting the high temperatures is represented by pixels near the center pixel when the thermal camera images the scene, and (ii) the temperature readings for those pixels are weighted more heavily than the temperature readings for pixels further away from the center pixel. Alternatively, in an instance in which the maximum-weighted point is configurable, the operator can adjust the maximum-weighted point to be near pixels corresponding to the high temperatures. For instance, the operator can click on a group of pixels on a touchscreen, or move the position of the maximum-weighted point using a keypad, cursor, or other input device.

Additional functionalities and examples of the described methods and systems are also described hereinafter with reference to the accompanying figures.

II. Example Architecture

Referring now to the Figures, FIG. 1 illustrates an example system 2. As shown in FIG. 1, system 2 includes a vehicle 4, a thermal camera 6, a communication network 8, and a server computing system (SCS) 10.

Vehicle 4 is a mobile machine that can be used to transport a person, people, or cargo. A vehicle can be driven or otherwise guided along a path (e.g., a paved road or otherwise) on land, in water, or in the air or outer space. A vehicle can be wheeled, tracked, railed, or skied. A vehicle can be guided by a user within the vehicle or by a user outside of the vehicle by use of a remote control. A vehicle can be guide at least partially autonomously. In the case of an autonomous vehicle, the vehicle can at least sometimes be guided along a path without any person or cargo inside or on the vehicle. A vehicle can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, a farm machine, a van (such as a dry or refrigerated van), a tank trailer, a platform trailer, a drone, or an automobile carrier. A vehicle can include or use any appropriate voltage or current source, such as a battery, an alternator, a fuel cell, and the like. A vehicle can include or use any desired drive system or engine. That drive system or engine can include items that use fossil fuels, such as gasoline, natural gas, propane, and the like, electricity, such as that generated by a battery, magneto, fuel cell, solar cell and the like, wind and hybrids or combinations thereof. A vehicle can include an electronic control unit (ECU), a data link connector (DLC), and a vehicle communication link that connects the DLC to the ECU. The ECU can detect a malfunction in the vehicle and set a diagnostic trouble code (DTC) to an active status.

A vehicle manufacturer can build various quantities of vehicles each calendar year (i.e., January $1^{st}$ to December $31^{st}$). In some instances, a vehicle manufacturer defines a model year for a particular vehicle model to be built. The model year can start on a date other than January $1^{st}$ or can end on a date other than December $31^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can include indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine (ICE)) within the vehicle. A person skilled in the art will understand that other features in addition to or as an alternative to "engine type" can be used to identify a vehicle using particular vehicle identifying information, and for some purposes, a vehicle could be identified by its make and model M/M. These other features can be identified in various manners, such as a regular production option (RPO) code, such as the RPO codes defined by the General Motors Company LLC, Detroit Mich. Furthermore, the vehicle identifying information can be combined and displayed as a vehicle identification number (VIN). The VIN can be displayed on a VIN label.

Thermal camera 6 may be used to capture and display images of components of the vehicle 4. Thermal camera 6 may take the form of a computing device and be configured for communication with SCS 10 via a communication link 12 and a communication link 14, and communication network 8. As depicted in further detail in FIG. 2, thermal camera 6 can include a processor, a computer-readable medium, and a camera module.

Communication network 8 may include one or more computing devices networked via a wide-area network or a local area network. Communication network 8 may take the form of the internet, for example. As such, communication link 12 and communication link 14 may take the form of wired (e.g., Ethernet) or wireless (e.g., Bluetooth, WiFi, etc.) communication links.

SCS 10 may take the form of one or more computing devices (e.g., a server). In some examples, the SCS 10 may store information that is useful for repairing vehicles.

Figure 2:
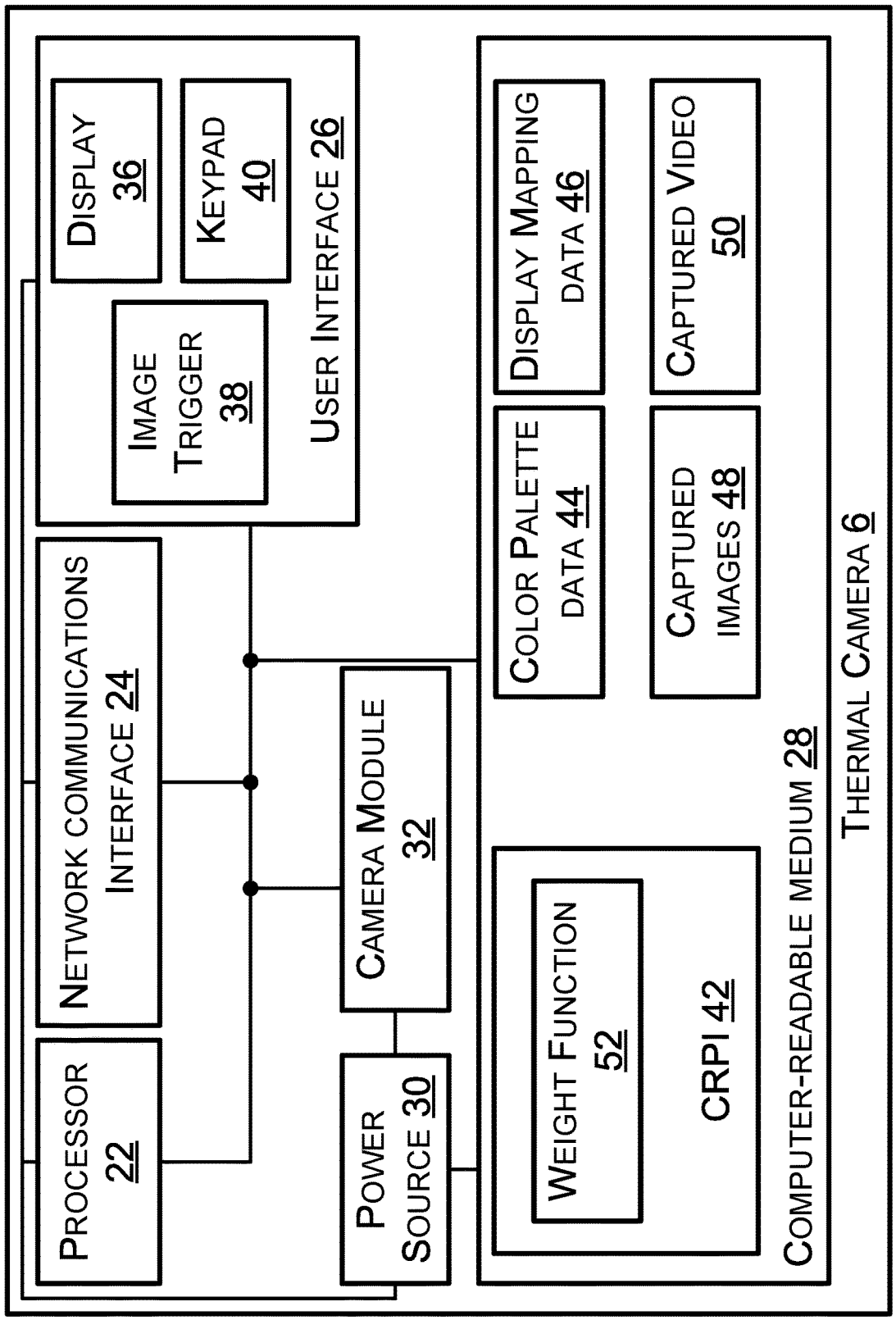
FIG. 2 is a block diagram of the example thermal camera of FIG. 1.

FIG. 2 is a block diagram of thermal camera 6. As shown in FIG. 2, thermal camera 6 can include a processor 22, a network communications interface 24, a user interface 26, a computer-readable medium (CRM) 28, a power source 30, and a camera module 32.

A processor, such as processor 22 or any other processor discussed in this description, can include one or more processors. Any processor discussed in this description can thus be referred to as least one processor or one or more processors. A processor can include a general purpose processor (e.g., an INTEL® single core microprocessor or an INTEL® multicore microprocessor), or a special purpose processor (e.g., a digital signal processor, a graphics processor, an embedded processor, or an application specific integrated circuit (ASIC) processor). A processor can be configured to execute computer-readable program instructions (CRPI). The CRPI discussed in this disclosure, such as CRPI 42, can include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a conventional procedural programming language, such as the "C" programming language. A processor can be configured to execute hard-coded functionality in addition to or as an alternative to software-coded functionality (e.g., via CRPI). Processor 22 can be programmed to perform any function or combination of functions described herein as being performed by thermal camera 6.

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that processor 22 can, but need not necessarily, include (a) an advanced RISC (reduced instruction set computer) machine (ARM) processor (e.g., an AT91SAM4E ARM processor provided by the Atmel Corporation, San Jose, Calif.), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

Network communications interface 24 can include one or more transmitters configured to transmit data onto a network, such as communication network 8 of FIG. 1. Additionally or alternatively, network communications interface 24 can include one or more receivers configured to receive data carried over communication network 8. The data transmitted or received can include any data discussed in this disclosure.

By way of example, network communications interface 24 can include a modem, a network interface card, and/or a chip mountable on a circuit board. As an example the chip can comprise a CC3100 Wi-Fi® network processor available from Texas Instruments, Dallas, Tex., a CC256MODx Bluetooth® Host Controller Interface (HCI) module available from Texas instruments, and/or a different chip for communicating via Wi-Fi®, Bluetooth® or another communication protocol.

User interface 26 can include a display 36, an image trigger 38, and a keypad 40. Display 36 can be configured to display an image captured by thermal camera 6. Display 36 can, but need not necessarily, include a capacitive touch screen display, a resistive touch screen display, a plasma display, a light emitting diode (LED) display, a cathode ray tube display, an organic light-emitting diode (OLED) display, or a liquid crystal display (LCD). An OLED display can include an active-matrix OLED or a passive-matrix OLED. The LCD can be backlit, color LCD. Display 36 can include a touch screen display with the LCD. For instance, display 36 can include a capacitive (such as a projective capacitive) touch screen display or a resistive touch screen display. Image trigger 38 can be a switch mechanism for controlling thermal camera 6. In one example, pressing, squeezing, or otherwise triggering image trigger 38 can cause thermal camera 6 to acquire an image. Keypad 40 can include one or more keys for controlling operation of thermal camera 6. In one example, image trigger 38 and/or keypad 40 could be virtual user-interface elements provided on display 36.

CRM 28 can include a non-transitory CRM, a transitory CRM, or both a non-transitory CRM and a transitory CRM. A non-transitory CRM, or a portion thereof, can be located within or as part of a processor (e.g., within a single integrated circuit chip). A non-transitory CRM, or a portion thereof, can be separate and distinct from a processor.

A non-transitory CRM can include a volatile or non-volatile storage component, such as an optical, magnetic, organic or other memory or disc storage component. Additionally or alternatively, a non-transitory CRM can include or be configured as a random-access memory (RAM), a read-only memory (ROM), a programmable read-only memory (PROM), an erasable programmable read-only memory (EPROM), an electrically erasable programmable read-only memory (EEPROM), or a compact disk read-only memory (CD-ROM). The RAM can include static RAM or dynamic RAM.

A transitory CRM can include, for example, CRPI provided over a communication link, such as the communication link 12 of FIG. 1.

A computer-readable medium can be referred to by other terms such as a "computer-readable storage medium," a "data storage device," a "memory device," a "memory," "computer-readable media," a "computer-readable database," "at least one computer-readable medium," or "one or more computer-readable medium." Any of those alternative terms can be preceded by the prefix "transitory" if the CRM is transitory or "non-transitory" if the CRM is non-transitory.

CRM 28 can include CRPI 42, color palette data 44, display mapping data 46, captured images 48, and captured video 50. CRPI 42 can include instructions executable by processor 22 for carrying out the processor functions described herein. For example, CRPI can include instructions for assigning weights to temperature readings using a weight function 52, determining a weighted average, determining whether the weighted average satisfies a threshold condition, determining a gain state, and causing thermal camera 6 to operate in the gain state.

The color palette data 44 may include one or more color palettes for mapping temperatures (e.g., wavelengths) represented by thermal image data to brightness levels and/or colors, as is known in the art. For example, a first color palette may map temperatures to various shades of orange and/or levels of brightness, whereas a second color palette may map temperatures to various shades of purple and/or levels of brightness. The thermal image data can be received from camera module 32 and, optionally, stored in CRM 28.

Display mapping data 46 may include templates for displaying thermal images simultaneously with information related to servicing vehicles. For example, a user may select one of many display templates such that a thermal image of a vehicle and information related to servicing the vehicle are displayed at various relative locations within display 36 based on the selected display template. Such information can be received by way of network communications interface 24.

Captured images 48 may include image data corresponding to thermal images captured by thermal camera 6. Captured video 50 may include image data corresponding to thermal images captured as a video stream by thermal camera 6.

Power source 30 can include a battery. Additionally or alternatively, power source 30 can include a port for coupling thermal camera 6 to a power adapter. The power adapter can provide an electrical current to power thermal camera 6 or any one or more components of thermal camera 6, and/or to charge a battery of thermal camera 6. Power source 30 can provide power to processor 22, network communications interface 24, user interface 26, CRM 28, and/or camera module 32.

Camera module 32 can be configured to form an image of a portion of a vehicle, such as vehicle 4 of FIG. 1, using infrared radiation emitted by the vehicle. As an example, the portion of vehicle 4 could include at least one of the following components of the vehicle: a cooling system radiator, an exhaust manifold, an heating, cooling and air conditioning (HVAC) vent door, a wheel bearing, or an engine block. Other examples of the portion of vehicle 4 are also possible.

Camera module 32 can be configured to operate in one of multiple gain states, and can be capable of switching its operation from one gain state to another. For instance, camera module 32 can be configured to switch between operation in an either a high-gain state or a low-gain state. The gain state can control a temperature sensitivity of the camera module or an intra-scene range of the thermal camera. In one instance, the high-gain state may provide a first, high accuracy and support a narrow intra-scene range of temperatures, while the low-gain state may provide a second, lower accuracy but support a higher intra-scene range of temperatures. The narrow intra-scene range of temperatures could span from a first minimum temperature to a first maximum temperature, and the higher intra-scene range of temperatures could span from the first minimum temperature to a second maximum temperature, with the second maximum temperature being greater than the first maximum temperature.

As a particular example, in the high-gain state, camera module 32 may have an accuracy of ±5° C. and an intra-scene range of about −10° C. to 140° C., and in the low-gain state, camera module 32 may have an accuracy of ±10° C. and an intra-scene range of about −10° C. to 450° C. When camera module 32 operates in the high-gain state and a scene imaged by camera module 32 includes temperatures above 140° C., those temperatures may saturate sensors of camera module 32. To view the temperatures above 140° C., the camera module 32 can be switched to the low-gain state, so that the temperatures above 140° C. may be more accurately quantified and visualized.

In some examples, camera module 32 can be configured to operate in one of more than two gain states. For instance, camera module 32 can be configured to operate in a low-gain state, a medium-gain state, or a high-gain state.

Camera module 32 can also be configured to operate in either an automatic gain-state switching mode or a manual gain-state switching mode. In the automatic gain-state switching mode, camera module 32 may automatically switch between the low-gain state and the high-gain state based on a fixed percentage of pixels having temperature readings above or below a threshold. In the manual gain-state switching mode, camera module 32 can be manually controlled to be in either the low-gain state or the high-gain state. Camera module 32 can be switched between the automatic gain-state switching mode and the manual gain-state switching mode by operation of the keypad 40 and/or display 36. Camera module 32 can also be switched between the automatic gain-state switching mode and the manual gain-state switching mode by transmitting a software command to camera module 32 or by providing an electrical signal to a pin of a camera module 32.

When in the manual gain-state switching mode, processor 22 can cause camera module 32 to switch between the low-gain state and the high-gain state by transmitting a software command to camera module 32 or by providing an electrical signal to a pin of camera module 32.

Thermal camera 6 can also include an automatic gain-state switching feature. An operator of thermal camera 6 can enable or disable the automatic gain-state switching using keypad 40 and/or display 36. For instance, the operator can use keypad 40 and/or display 36 to navigate a menu of options and specify whether automatic gain-state switching is enabled or disabled.

In line with the discussion above, when automatic gain-state switching is enabled for thermal camera 6, processor 22 can cause camera module 32 to operate in the manual gain-state switching mode, and can further cause camera module 32 to switch between a first gain state and a second gain state. By way of example, processor 22 can determine a weighted average of temperature readings for pixels of an image captured by the thermal camera, and use the weighted average to determine a gain state for the thermal camera. Further, upon determining that the gain state is different from a current gain state at which the thermal camera is operating, processor 22 can cause camera module 32 to switch between the current gain state and the gain state.

An operator of thermal camera 6 can also use keypad 40 and/or display 36 to specify other information. For instance, the operator can use keypad 40 and/or display 36 to specify a region of interest or a maximum-weighted point.

Figure 3:
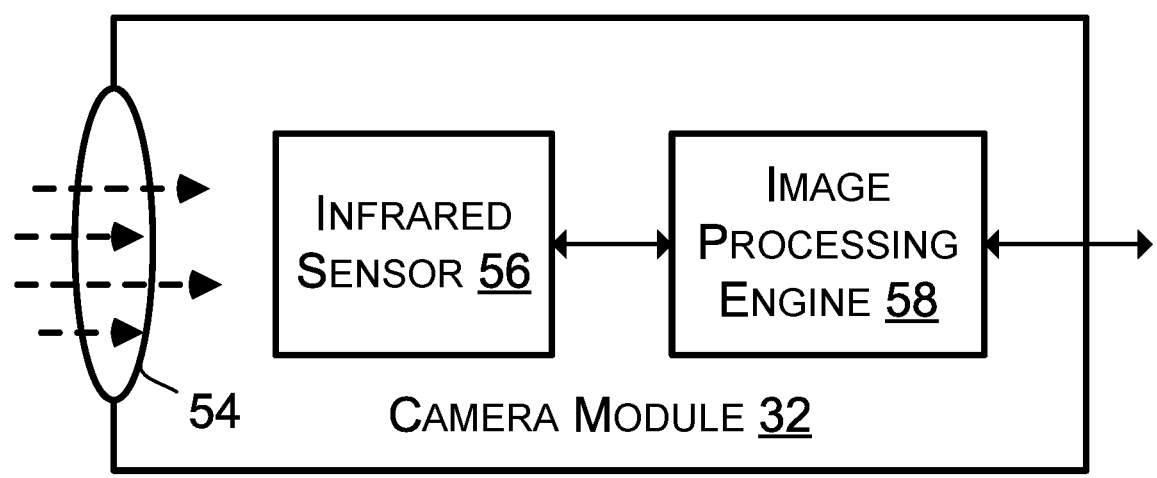
FIG. 3 is a block diagram of the example camera module of FIG. 2.

FIG. 3 is a block diagram of camera module 32. As shown in FIG. 3, camera module 32 can include a lens assembly 54, an infrared sensor 56, and an image processing engine 58.

Lens assembly 54 can be configured to focus infrared radiation from a scene onto infrared sensor 56. As such, lens assembly 54 can include one or more optical lenses.

Infrared sensor 56 can include an array of thermal detectors and a readout component. As an example, infrared sensor can include an 80×60 array of thermal detectors that is configured to detect infrared radiation in a response wavelength band. Each thermal detector may have an element, such as a microbolometer, whose temperature fluctuates in response to incident flux. For each individual element, a change in temperature may, in turn, cause a proportional change in resistance. As another example, each thermal detector can include a thermopile sensor. The readout component can be configured to sense the resistance of each thermal detector, thereby determining thermal data indicative of a temperature detected by the thermal detector. By way of example, the readout component can include a readout integrated circuit.

Image processing engine 58 can be configured to receive data from infrared sensor 56, process the data, and output temperature readings corresponding to respective thermal detectors of infrared sensor. In one example, image processing engine can be configured to output temperature readings for each pixel of a plurality of pixels of an image. Each pixel can correspond to a respective thermal detector of infrared sensor 56. Further, image processing engine could be configured to output temperature readings for the pixels periodically (e.g., once per minute, multiple times per minute, once per second, multiple times per second, etc.).

In addition, image processing engine can be configured to control other functionalities of camera module 32. As examples, image processing engine 58 can generate timing and control signals, deserialize data received from infrared sensor 56, process and respond to control commands, handle power management, implement an image pipeline, and/or implement a video pipeline.

In one example, image processing engine 58 can include a command and control interface through which image processing engine 58 is configured to receive command and control commands. For instance, image processing engine 58 can be configured to receive, by way of the command and control interface, a software command for causing the camera module 32 to operate in the manual gain-state switching mode, a software command for causing the camera module 32 to operate in the low-gain state, and/or a software command for causing the camera module 32 to operate in the high-gain state.

Camera module 32 can also include a plurality of pins. Individual pins of the plurality of pins can be configured to receive an electrical signal, such as a current signal or a voltage signal. In response to detecting a particular signal at a given pin of the plurality of pins, camera module 32 can be configured to perform a function corresponding to the particular signal being received at the given pin. As one example, in response to detecting a high voltage signal at a gain-state pin, camera module 32 can be configured to transition to operating in a low-gain state. As another example, in response to detecting a signal pulled to ground at the gain-state pin, camera can be configured to transition to operating in a high-gain state.

Camera module 32 could include a Lepton® camera module available from FLIR Systems, Inc. of Wilsonville, Oreg., for example.

Figure 4:
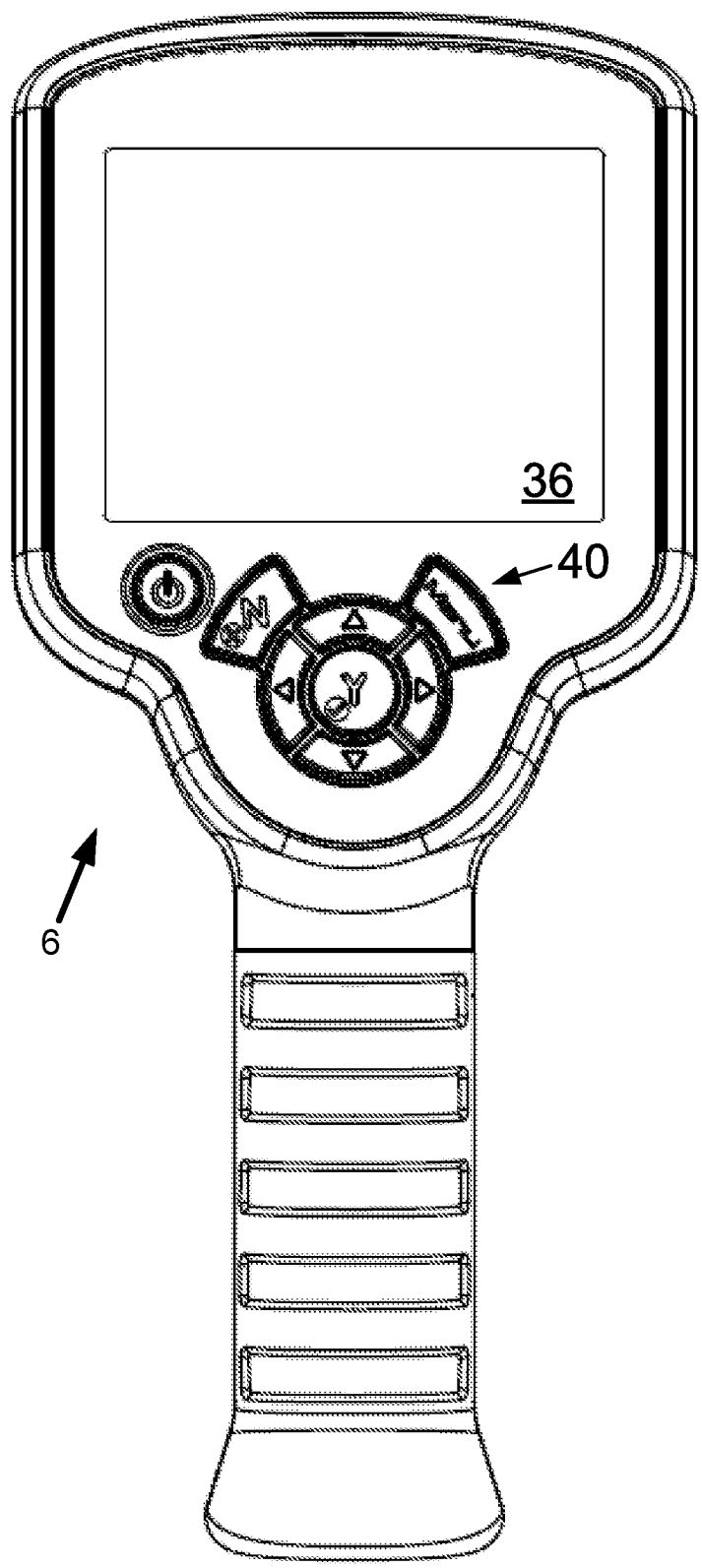
FIG. 4 is a conceptual illustration of the example thermal camera of FIG. 1.

FIG. 4 is a conceptual illustration of thermal camera 6. In other examples, thermal camera 6 may take other forms. Hence, the conceptual illustration shown in FIG. 4 is not meant to be limiting.

III. Example Operations

Figure 5:
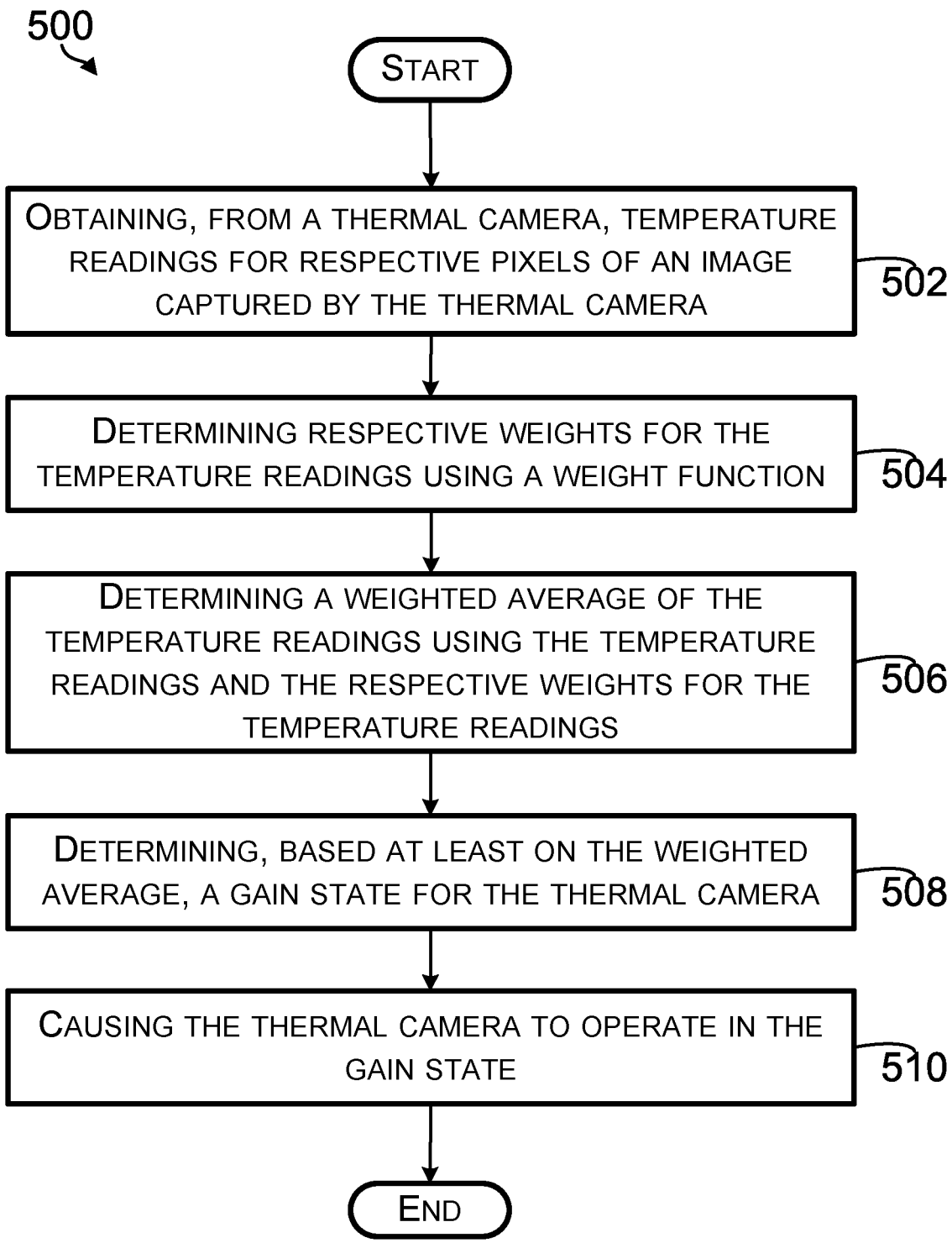
FIG. 5 is a flow chart depicting an example method for controlling a gain state of a thermal camera.

In line with the discussion above, a processor of (or otherwise connected to) a thermal camera, such as thermal camera 6, can be configured to use temperature readings obtained from the camera module to control a gain state of the thermal camera. Turning now to FIG. 5, FIG. 5 is a flow chart of an example method 500 for controlling a gain state of a thermal camera. Method 500 shown in FIG. 5 presents an embodiment of a method that could be used or implemented by thermal camera 6 of FIG. 1, for example, or by components of thermal camera 6, or more generally by any of a variety of computing devices. Method 500 can include one or more operations, functions, or actions as illustrated by one or more of blocks 502-510. Although the blocks are illustrated in a sequential order, these blocks can also be performed in parallel, and/or in a different order than those described herein. Also, the various blocks can be combined into fewer blocks, divided into additional blocks, and/or removed based upon the desired implementation.

In addition, for the method 500 and other processes and methods disclosed herein, the block diagram shows functionality and operation of one possible implementation of present embodiments. In this regard, each block can represent a module, a segment, or a portion of program code, which includes one or more instructions executable by a processor or computing device for implementing specific logical functions or steps in the process. The program code can be stored on any type of computer-readable medium, for example, such as a storage device including a disk or hard drive. The computer-readable medium can include non-transitory computer-readable medium, for example, such as computer-readable media that stores data for short periods of time like register memory, processor cache and random access memory (RAM). The computer-readable medium can also include non-transitory media, such as secondary or persistent long term storage, like read only memory (ROM), optical or magnetic disks, compact-disc read only memory (CD-ROM), for example. The computer-readable medium can also be any other volatile or non-volatile storage systems. The computer-readable medium can be considered a computer-readable storage medium, for example, or a tangible storage device.

In addition, for the method 500 and other processes and methods disclosed herein, each block in FIG. 5 can represent circuitry that is wired to perform the specific logical functions in the process.

Initially, at block 502, the method 500 includes obtaining, from a thermal camera, temperature readings for respective pixels of an image captured by the thermal camera. In one instance, a processor can receive temperature readings for each pixel of an image captured by the thermal camera. As an example, the processor can receive a temperature reading for each pixel of a 60×80 grid of pixels, such that the processor receives four thousand, eight hundred temperature readings in total.

At block 504, the method 500 includes determining respective weights for the temperature readings using a weight function. Generally, the weight function is a process or relation that associates each pixel of the plurality of pixels with a weight of a possible set of weights. The weight function could be implemented using a mathematical expression and/or a correlation table. The weight could be a percentage between a minimum percentage and a maximum percentage, such as a percentage between 0% and 100% or a percentage between 25% and 75%. Alternatively, the weight could be a numerical value between a minimum numerical value and a maximum numerical value, such a numerical value between zero and one.

In line with the discussion above, a processor can use the weight function to assign a weight to a given temperature reading for a given pixel based on a proximity of the given pixel to a maximum-weighted point, with the weight being inversely proportional to a distance between the given pixel and the maximum-weighted point. In some instance, the weight could increase linearly as the distance decreases. In other instances, the weight could increase exponentially as the distance decreases.

In one example, the weight function can be a process or relation that (a) receives as input (i) a row and column of the maximum-weighted point and (ii) a row and column of the given pixel, and (b) outputs as an output a weight. For instance, the weight function can be used to calculate a distance between the maximum-weighted point and the given pixel, and normalize the distance to a numerical value that is between a minimum weight and a maximum weight.

Alternatively, the weight function can be a process or relation that receives as input a distance between a pixel and a maximum-weighted point and outputs a weight. In this arrangement, the processor could determine the distance, and then use the weight function to determine the weight.

In some examples, the maximum-weighted point could be a center pixel of the plurality of pixels. In other examples, there may be subset of pixels within the plurality of pixels that is designated as a region of interest, and the maximum-weighted point could be a center pixel of the region of interest. The region of interest could, for instance, be a row-and-column grid of pixels within the plurality of pixels. Optionally, the region of interest could be centered vertically and/or horizontally within the plurality of pixels. In other instances, the region of interest could take another shape, such as a circle or polygon. As an alternative, the region of interest could be an arbitrary shape that is drawn or otherwise specified by an operator, such as region that is drawn by hand on a touchscreen or by manipulating a cursor.

In some examples, determining respective weights for the temperature readings may involve determining respective weights for each temperature reading. Further, determining the respective weights for the temperature readings could involve determining a weight of zero for one or more of the temperature readings. For instance, an operator can designate a subset of pixels of the plurality of pixels as a region of interest. In this arrangement, the processor could determine that a weight for each pixel outside of the region of interest is zero. The processor could then determine a weight for each pixel inside of the region of interest using the weight function. The weight function could be formulated such that, pixels at the edges of the region of interest are assigned weights of zero or near zero and, as the pixels get closer to the center of the region of interest, the weight increases. It is also possible that the maximum-weighted point could be on or near an edge of the region of interest. In this scenario, temperature readings for pixels on or near the edge of the region of interest could be assigned a maximum weight or a weight that is near the maximum weight.

At block 506, the method 500 includes determining a weighted average of the temperature readings using the temperature readings and the respective weights for the temperature readings. By way of example, a processor could determine the weighted average by multiplying the temperature readings by the respective weights for the temperature readings, and then average the products. For instance, the processor could multiply a first temperature reading by a first weight yielding a first product, multiply a second temperature reading by a second weight yielding a second product, multiply a third temperature reading by a third weight yielding a third product, and so forth. The processor could then average all of the products to determine the weighted average.

At block 508, the method 500 includes determining, based at least on the weighted average, a gain state for the thermal camera. As an example, a processor could determine the gain state by determining whether the weighted average satisfies a threshold condition. The threshold condition could vary based on a current gain state of the thermal camera. For instance, if the thermal camera is currently operating in a high-gain state, the threshold condition could be whether the weighted average is greater than a high-temperature threshold, such as whether the weighted average is greater than 110° C. If the weighted average is greater than the high-temperature threshold, the processor could determine a low-gain state as the gain state. Whereas, if the weighted average is less than or equal to the high-temperature threshold, the processor could determine a high-gain state as the gain state.

Similarly, if the thermal camera is currently operating in a low-gain state, the threshold condition could be whether the weighted average is less than a low-temperature threshold, such as whether the weighted average is less than 95° C. If the weighted average is less than the low-temperature threshold, the processor could determine a high-gain state as the gain state. Whereas, if the weighted average is greater than or equal to the low-temperature threshold, the processor could determine a low-gain state as the gain state. Thus, the method 500 could also involve determining a current gain state of the thermal camera, and determining the threshold condition based on the current gain state.

At block 510, the method 500 includes causing the thermal camera to operate in the gain state. Causing the thermal camera to operate in the gain state could involve causing the thermal camera to capture an image in the gain state. For instance, causing the thermal camera to operate in the gain state could involve causing the thermal camera to transition from operating in a first gain state to operating in a second gain state, such as transitioning from operating in a low-gain state to operating in a high-gain state or vice versa. The processor could cause the thermal camera to operate in the gain state upon determining that the gain state is different from a current gain state. Further, in some examples, the method 500 can also include causing the thermal camera to display the image captured in the gain state.

A processor could cause the thermal camera to operate in the gain state in various ways. As one example, the processor could transmit a software command to a camera module of the thermal camera, and reception of the software command could cause the thermal camera to operate in the gain state. The software command could be transmitted over a command and control interface, for instance. As another example, the processor could provide an electrical signal to a pin of a camera module of the thermal camera.

In some examples, the method 500 can further include determining a region of interest within the plurality of pixels. In line with the discussion above, the region of interest could be a square, rectangle, circle, or polygon, or the region of interest could have an arbitrary shape. Determining the region of interest could involve receiving by way of a user interface data specifying the region of interest. The data could include four corner pixels defining a square or rectangle, a center pixel and a radius defining a circular region, or a list of pixels defining edges of the region of interest. The list of pixels defining edges of the region of interest could be indicative or a region drawn by a user, such as region drawn on a touchscreen or drawn by manipulating a cursor. The data specifying the region of interest could take other forms as well.

In some examples, the method 500 can further include applying a hysteresis so that the gain state is determined based on weighted averages for multiple frames of data. For example, the thermal camera could output temperature readings at a fixed frame rate (e.g., 35 milliseconds). With this arrangement, a processor could determine n weighted averages corresponding to n consecutive frames of temperature readings, respectively, with n being an integer that is greater than one. The processor could then determine the gain state based on the n weighted averages rather than just a single weighted average.

As one example, the processor could determine whether n consecutive weighted averages satisfy a threshold condition, and based on the determination, determine the gain state. For instance, if the thermal camera is currently operating in a high-gain state, the threshold condition could be whether the weighted averages for n consecutive frames are greater than a high-temperature threshold, such as whether the weighted averages are greater than 110° C. If the weighted averages are greater than the high-temperature threshold, the processor could determine a low-gain state as the gain state. Whereas, if one or more of the weighted averages is less than or equal to the high-temperature threshold, the processor could determine a high-gain state as the gain state.

Similarly, if the thermal camera is currently operating in a low-gain state, the threshold condition could be whether the weighted averages for n consecutive frames are less than a low-temperature threshold, such as whether the weighted averages are less than 95° C. If the weighted averages are less than the low-temperature threshold, the processor could determine a high-gain state as the gain state. Whereas, if one or more of the weighted averages is greater than or equal to the low-temperature threshold, the processor could determine a low-gain state as the gain state.

In some examples, the method 500 can further include causing the thermal camera to operate in a manual gain-switching mode. For instance, a processor could transmit a software command to a camera module of the thermal camera, with reception of the software command causing the thermal camera to operate in the manual gain-switching state. Alternatively, causing the thermal camera to operate in the manual gain-switching mode could involve providing an electrical signal to a pin of a camera module of the thermal camera.

In some examples, the method 500 can also include determining a zoom region. The zoom region could correspond to a subset of pixels of the plurality of pixels. When a zoom feature of the thermal camera is activated, only the subset of pixels may be displayed on a display of the thermal camera rather than all of the plurality of pixels being displayed on the thermal camera.

With the zoom feature activated, a weighted average could be determined in various ways. In one approach, the weighted average could be determined based on weights and temperature readings corresponding to all pixels of the plurality of pixels. For instance, a weight function could assign a weight between a maximum weight and a minimum weight to temperature readings for pixels within the zoom region and assign a minimum weight to temperature reading pixels outside of the zoom region. In other words, where the minimum weight is non-zero, even if only the subset of pixels corresponding to the zoom region is displayed by the thermal camera, the weighted average could be determined based on temperature readings and respective weights for both pixels within the zoom region (that can displayed by the thermal camera) and pixels outside of the zoom region (that might not displayed by the thermal camera when the zoom feature is activated).

Alternatively, in another approach, the weighted average could be determined based on only weights and temperature readings for pixels within the zoom region. In other words, temperature readings for pixels outside of the zoom region might not contribute to the weighted average. Other approaches are also possible.

Figure 6:
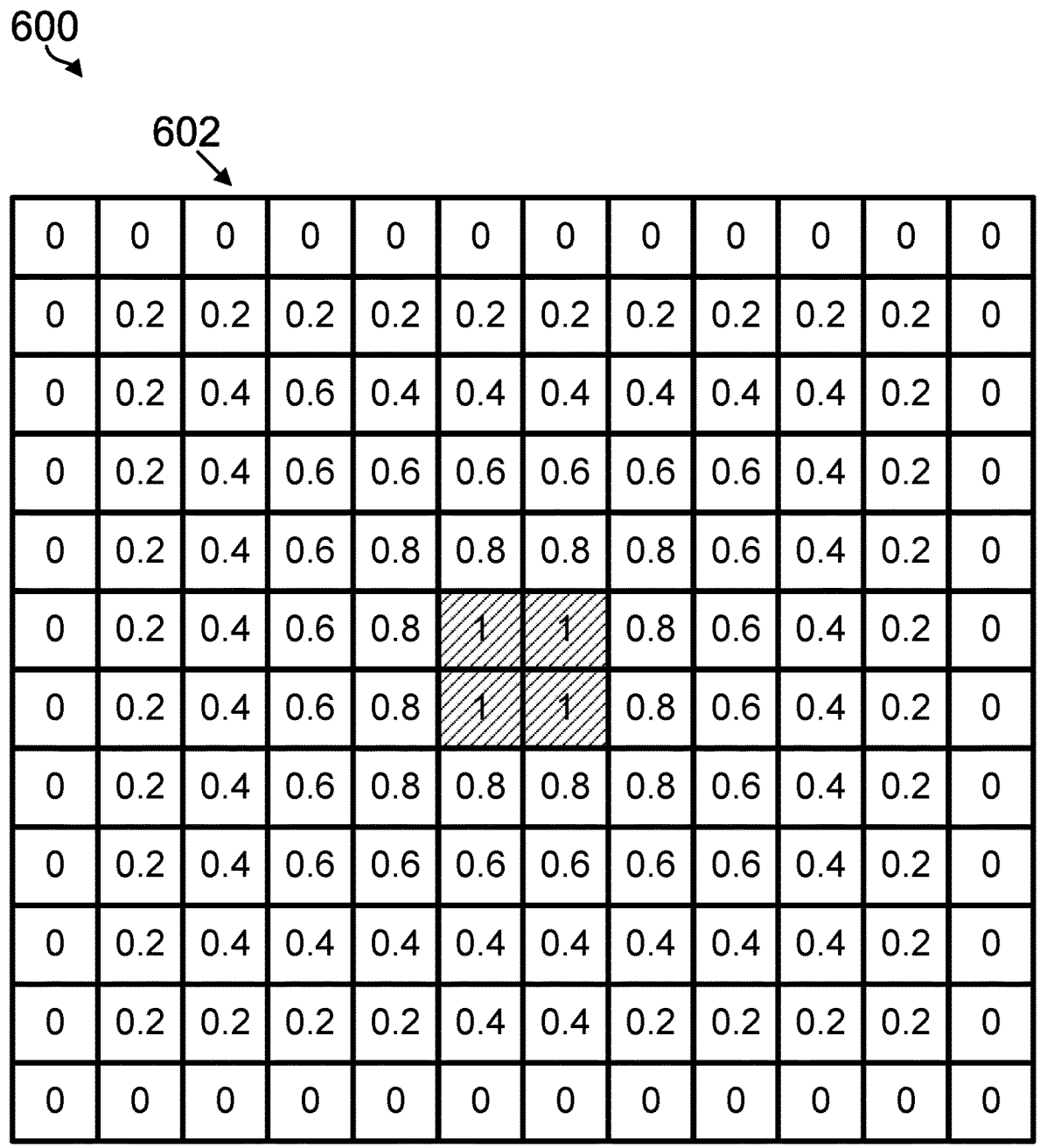
FIG. 6 is a conceptual illustration of example weights corresponding to pixels of an image.

FIG. 6 is a conceptual illustration 600 of example weights corresponding to pixels 602 of an image. The conceptual illustration 600 depicts a simplified example for an image which includes twelve rows and twelve columns of pixels and one hundred forty-four pixels in total. In addition, in FIG. 6, each pixel 602 is labeled with a respective weight assigned to a temperature reading corresponding to the pixel using a weight function. Further, FIG. 6 depicts four center pixels, which are shaded with the diagonal fill pattern.

As shown in FIG. 6, the center pixels correspond to the maximum-weighted point and are assigned a weight of 1. Whereas, edge pixels of the image are assigned a weight of zero. In other examples, the edge pixels may be assigned a weight that is non-zero. Further, the pixels between the center pixels and the edge pixels are assigned weights between 0 and 1, with the weights decreasing as the distance between the pixel and the center pixels increases. For the conceptual illustration 600, the weights for the pixels decrease approximately linearly as the distance between the pixels and the center pixels increases. In other examples, the weights for the pixels may decrease approximately exponentially as the distance between the pixels and the center pixels increases.

Furthermore, for the conceptual illustration 600, the maximum weight is 1, which may correspond to 100%, and the minimum weight is zero, which may correspond to 0%. In other examples, the maximum weight can be less than 100% and/or the minimum weight can be greater than 0%.

FIG. 7 is another conceptual illustration 700 of example weights corresponding to pixels 602 of an image. Like the conceptual illustration 600 of FIG. 6, the conceptual illustration 700 depicts a simplified example for an image which includes twelve rows and twelve columns of pixels and one hundred forty-four pixels in total. In addition, in FIG. 7, each pixel 702 is labeled with a respective weight assigned to a temperature reading corresponding to the pixel using a weight function.

Unlike the conceptual illustration 600 of FIG. 6, the conceptual illustration 700 depicts a region of interest 704. The region of interest 704 of FIG. 7 includes a subset of pixels of the image. The subset of pixels include the pixels having the dotted fill pattern and the center pixel having the diagonal fill pattern. As noted above, in other examples, a region of interest could include all of the pixels 702.

As shown in FIG. 7, the center pixel is assigned a weight of 1, edge pixels of the region of interest 704 are assigned a weight of 0.1, and pixels between the center pixel and the edge pixels are assigned weights that decrease as the distance between the pixels and the center pixels increases.

As further shown in FIG. 7, pixels outside of the region of interest are assigned a minimum weight. In line with the discussion above, the minimum weight could be zero or non-zero depending on the desired implementation.

Figure 8:
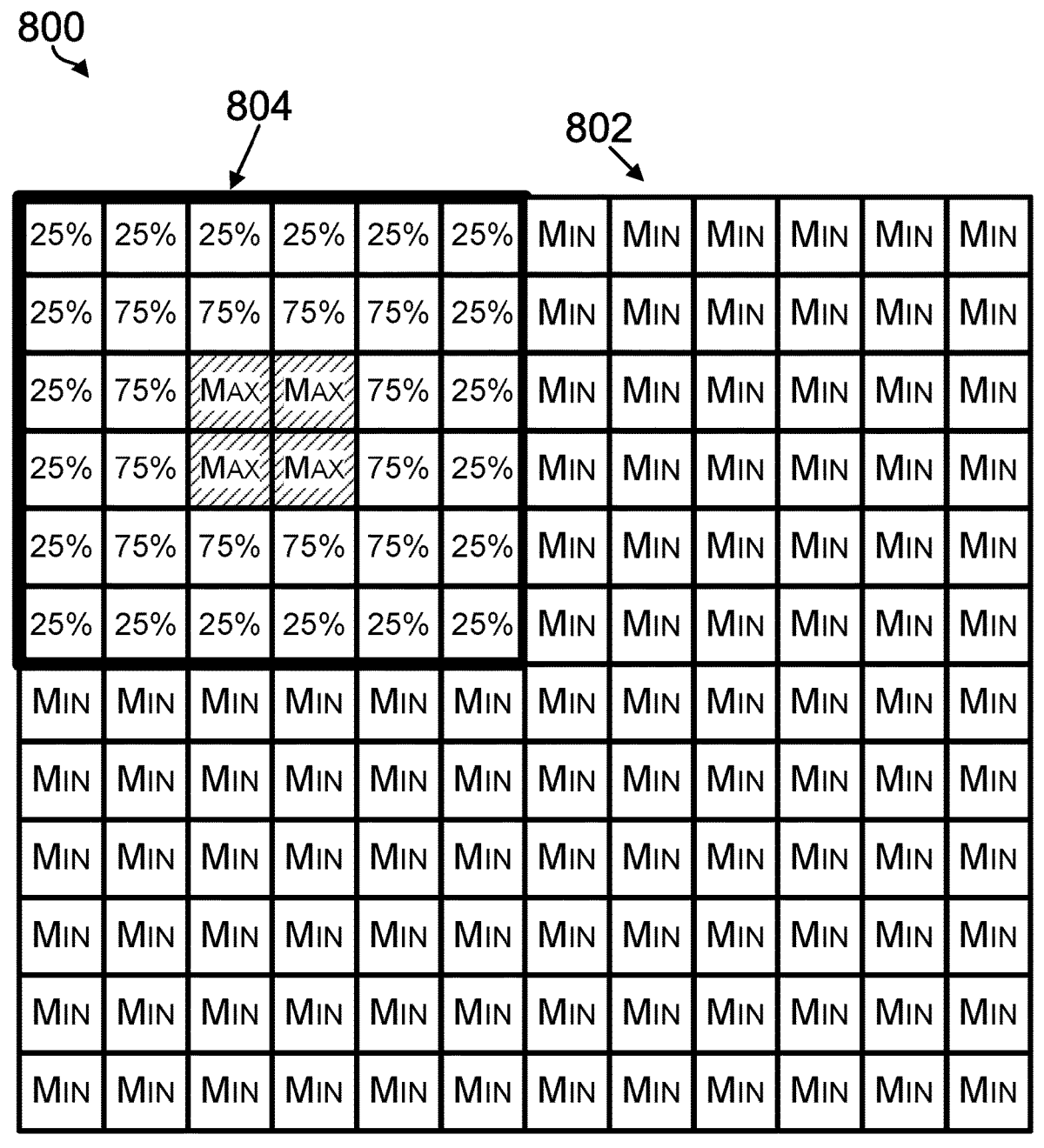

FIG. 8 is another conceptual illustration 800 of example weights corresponding to pixels 802 of an image. Like the conceptual illustration 600 of FIG. 6, the conceptual illustration 800 depicts a simplified example for an image which includes twelve rows and twelve columns of pixels and one hundred forty-four pixels in total. In addition, in FIG. 8, each pixel 802 is labeled with a respective weight assigned to a temperature reading corresponding to the pixel using a weight function.

Unlike the conceptual illustration 600 of FIG. 6, the conceptual illustration 800 depicts a zoom region indicator 804 that indicates a zoom region. The zoom region includes a subset of pixels of the image, and the zoom region has four center pixels that are shaded with a diagonal fill pattern. When a zoom feature of a thermal camera is activated, only the zoom region may be displayed on a display of the thermal camera rather than all of the plurality of pixels being displayed on the thermal camera.

As shown in FIG. 8, the center pixels are assigned a maximum, edge pixels of the zoom region are assigned a weight of 25%, and the weights assigned to pixels between the center pixels and the edge pixels decrease as the distance between the pixels and the center pixels increases.

As further shown in FIG. 8, pixels outside of the zoom region 804 are assigned a minimum weight. In line with the discussion above, the minimum weight could be zero or non-zero depending on the desired implementation.

This application incorporates by reference U.S. patent application Ser. No. 16/020,970, which was filed on Jun. 27, 2018, is entitled "Method and system for displaying images captured by a computing device including a visible light camera and a thermal camera."

This application incorporates by reference U.S. patent application Ser. No. 16/020,976, which was filed on Jun. 27, 2018, is entitled "Method and system for displaying images captured by a computing device including a visible light camera and a thermal camera."

This application incorporates by reference U.S. patent application Ser. No. 16/020,694, which was filed on Jun. 27, 2018, is entitled "Methods and Systems for Image Processing and Display."

It should be understood that arrangements described herein are for purposes of example only. As such, those skilled in the art will appreciate that other arrangements and other elements (e.g. machines, interfaces, functions, orders, and groupings of functions, etc.) can be used instead, and some elements can be omitted altogether according to the desired results. Further, many of the elements that are described are functional entities that can be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

Embodiments of the present disclosure may thus relate to one of the enumerated example embodiments (EEEs) listed below.

EEE 1 is a system comprising: a processor; and a non-transitory computer-readable medium having stored therein instructions that, when executed by the processor, cause the processor to perform functions comprising: (1) obtaining temperature readings for respective pixels of a plurality of pixels of an image captured by a thermal camera, (2) determining respective weights for the temperature readings using a weight function, wherein the weight function assigns a weight to a given temperature reading for a given pixel based on a proximity of the given pixel to a maximum-weighted point, and wherein the weight is inversely proportional to a distance between the given pixel and the maximum-weighted point, (3) determining a weighted average of the temperature readings using the temperature readings and the respective weights for the temperature readings, (4) determining, based at least on the weighted average, a gain state for the thermal camera, and (5) causing the thermal camera to operate in the gain state.

EEE 2 is the system of EEE 1, wherein the maximum-weighted point is a center pixel of the plurality of pixels.

EEE 3 is the system of EEE 1, wherein the maximum-weighted point is a center pixel of a region of interest.

EEE 4 is the system of EEE 3, wherein the weight function assigns a weight between a maximum weight and a minimum weight to temperature readings for pixels within the region of interest and assigns a minimum weight to temperature readings for pixels outside of the region of interest.

EEE 5 is the system of EEE 4, wherein the minimum weight is zero.

EEE 6 is the system of EEE 4 or 5, wherein the functions further comprise determining the region of interest.

EEE 7 is the system of EEE 6, wherein determining the region of interest comprises receiving data indicative of a region drawn on a touchscreen.

EEE 8 is the system of any one of EEE 1 to 7, wherein determining, based at least on the weighted average of the temperature readings, the gain state comprises determining that the weighted average of the temperature readings satisfies a threshold condition.

EEE 9 is the system of EEE 8, wherein the functions further comprise:
determining a current gain state of the thermal camera; and determining the threshold condition based on the current gain state.

EEE 10 is the system of any one of EEE 1 to 9, wherein: the temperature readings for the respective pixels of the plurality of pixels correspond to a given frame, determining the gain state is further based on n additional weighted averages corresponding to n consecutive frames prior to the given frame, respectively, and n is an integer greater than zero.

EEE 11 is the system of any one of EEE 1 to 10, wherein causing the thermal camera to operate in the gain state comprises causing the thermal camera to capture an image in the gain state.

EEE 12 is the system of EEE 11, wherein the functions further comprise providing for display the image captured in the gain state.

EEE 13 is the system of any one of EEE 1 to 12, wherein the functions further comprise causing the thermal camera to operate in a manual gain-switching mode.

EEE 14 is the system of any one of EEE 1 to 13, wherein causing the thermal camera to operate in the gain state comprises transmitting a software command to a camera module of the thermal camera, wherein reception of the software command causes the thermal camera to operate in the gain state.

EEE 15 is the system of any one of EEE 1 to 14, wherein causing the thermal camera to operate in the gain state comprises providing an electrical signal to a pin of a camera module of the thermal camera.

EEE 16 is the system of any one of EEE 1 to 15: wherein the functions further comprise determining a zoom region, wherein the zoom region corresponds to a subset of pixels of the plurality of pixels, and wherein the weight function assigns a weight between a maximum weight and a minimum weight to temperature readings for pixels within the zoom region and assigns a minimum weight to temperature readings for pixels outside of the zoom region.

EEE 17 is the system of any one of EEE 1 to 16, wherein the gain state controls a temperature sensitivity of the thermal camera or an intra-scene range of the thermal camera.

EEE 18 is a computer-implemented method comprising: (1) obtaining, by a processor from a thermal camera, temperature readings for respective pixels of a plurality of pixels of an image captured by the thermal camera; (2) determining, by the processor, respective weights for the temperature readings using a weight function, wherein the weight function assigns a weight to a given temperature reading for a given pixel based on a proximity of the given pixel to a maximum-weighted point, and wherein the weight is inversely proportional to a distance between the given pixel and the maximum-weighted point; (3) determining, by the processor, a weighted average of the temperature readings using the temperature readings and the respective weights for the temperature readings; (4) determining, by the processor based at least on the weighted average, a gain state for the thermal camera; and (5) causing, by the processor, the thermal camera to operate in the gain state.

EEE 19 is the method of EEE 18, wherein the maximum-weighted point is a center pixel of the plurality of pixels.

EEE 20 is the method of EEE 18, wherein the maximum-weighted point is a center pixel of a region of interest.

EEE 21 is the method of EEE 20, wherein the weight function assigns a weight between a maximum weight and a minimum weight to temperature readings for pixels within the region of interest and assigns a minimum weight to temperature readings for pixels outside of the region of interest.

EEE 22 is the method of EEE 21, wherein the minimum weight is zero.

EEE 23 is the method of EEE 21 or 22, further comprising: determining the region of interest.

EEE 24 is the method of EEE 23, wherein determining the region of interest comprises receiving data indicative of a region drawn on a touchscreen.

EEE 25 is the method of any one of EEE 18 to 24, wherein determining, based at least on the weighted average of the temperature readings, the gain state comprises determining that the weighted average of the temperature readings satisfies a threshold condition.

EEE 26 is the method of EEE 25, further comprising: determining a current gain state of the thermal camera; and determining the threshold condition based on the current gain state.

EEE 27 is the method of any one of EEE 18 to 26, wherein: the temperature readings for the respective pixels of the plurality of pixels correspond to a given frame, determining the gain state is further based on n additional weighted averages corresponding to n consecutive frames prior to the given frame, respectively, and n is an integer greater than zero.

EEE 28 is the method of any one of EEE 18 to 27, wherein causing the thermal camera to operate in the gain state comprises causing the thermal camera to capture an image in the gain state.

EEE 29 is the method of EEE 28, further comprising: providing for display the image captured in the gain state.

EEE 30 is the method of any one of EEE 18 to 29, further comprising: causing the thermal camera to operate in a manual gain-switching mode.

EEE 31 is the method of any one of EEE 18 to 30, wherein causing the thermal camera to operate in the gain state comprises transmitting a software command to a camera module of the thermal camera, wherein reception of the software command causes the thermal camera to operate in the gain state.

EEE 32 is the method of any one of EEE 18 to 31, wherein causing the thermal camera to operate in the gain state comprises providing an electrical signal to a pin of a camera module of the thermal camera.

EEE 33 is the method of any one of EEE 18 to 32, further comprising: determining a zoom region, wherein the zoom region corresponds to a subset of pixels of the plurality of pixels, and wherein the weight function assigns a weight between a maximum weight and a minimum weight to temperature readings for pixels within the zoom region and assigns a minimum weight to temperature readings for pixels outside of the zoom region.

EEE 34 is the method of any one of EEE 18 to 33, wherein the gain state controls a temperature sensitivity of the thermal camera or an intra-scene range of the thermal camera.

EEE 35 is a non-transitory computer-readable medium having stored therein instructions that, when executed by a processor, cause the processor to perform functions comprising: (1) obtaining temperature readings for respective pixels of a plurality of pixels of an image captured by a thermal camera; (2) determining respective weights for the temperature readings using a weight function, wherein the weight function assigns a weight to a given temperature reading for a given pixel based on a proximity of the given pixel to a maximum-weighted point, and wherein the weight is inversely proportional to a distance between the given pixel and the maximum-weighted point; (3) determining a weighted average of the temperature readings using the temperature readings and the respective weights; (4) determining, based at least on the weighted average, a gain state for the thermal camera; and (5) causing the thermal camera to operate in the gain state.

EEE 36 is a computer readable medium storing program instructions, that when executed by one or more processors, cause a set functions to be performed, the set of functions comprising a method in accordance with any one of EEEs 18-34.

What is claimed is:

1. A system comprising:
    a processor; and
    a non-transitory computer-readable medium having stored therein instructions that, when executed by the processor, cause the processor to perform functions comprising:
        obtaining temperature readings for respective pixels of a plurality of pixels of an image captured by a thermal camera,
        determining respective weights for the temperature readings using a weight function, wherein the weight function assigns a weight to a given temperature reading for a given pixel based on a proximity of the given pixel to a maximum-weighted point, and wherein the weight is inversely proportional to a distance between the given pixel and the maximum-weighted point, determining a weighted average of the temperature readings using the temperature readings and the respective weights for the temperature readings, determining, based at least on the weighted average, a gain state for the thermal camera, and causing the thermal camera to operate in the gain state.

2. The system of claim 1, wherein the maximum-weighted point is a center pixel of the plurality of pixels.

3. The system of claim 1, wherein the maximum-weighted point is a center pixel of a region of interest.

4. The system of claim 3, wherein the weight function assigns a weight between a maximum weight and a minimum weight to temperature readings for pixels within the region of interest and assigns a minimum weight to temperature readings for pixels outside of the region of interest.

5. The system of claim 4, wherein the minimum weight is zero.

6. The system of claim 4, wherein the functions further comprise determining the region of interest.

7. The system of claim 6, wherein determining the region of interest comprises receiving data indicative of a region drawn on a touchscreen.

8. The system of claim 1, wherein determining, based at least on the weighted average of the temperature readings, the gain state comprises determining that the weighted average of the temperature readings satisfies a threshold condition.

9. The system of claim 8, wherein the functions further comprise:

determining a current gain state of the thermal camera; and determining the threshold condition based on the current gain state.

10. The system of claim 1, wherein:

the temperature readings for the respective pixels of the plurality of pixels correspond to a given frame, determining the gain state is further based on n additional weighted averages corresponding to n consecutive frames prior to the given frame, respectively, and n is an integer greater than zero.

11. The system of claim 1, wherein causing the thermal camera to operate in the gain state comprises causing the thermal camera to capture an image in the gain state.

12. The system of claim 11, wherein the functions further comprise providing for display the image captured in the gain state.

13. The system of claim 1, wherein the functions further comprise causing the thermal camera to operate in a manual gain-switching mode.

14. The system of claim 1, wherein causing the thermal camera to operate in the gain state comprises transmitting a software command to a camera module of the thermal camera, wherein reception of the software command causes the thermal camera to operate in the gain state.

15. The system of claim 1, wherein causing the thermal camera to operate in the gain state comprises providing an electrical signal to a pin of a camera module of the thermal camera.

16. The system of claim 1:

wherein the functions further comprise determining a zoom region, wherein the zoom region corresponds to a subset of pixels of the plurality of pixels, and wherein the weight function assigns a weight between a maximum weight and a minimum weight to temperature readings for pixels within the zoom region and assigns a minimum weight to temperature readings for pixels outside of the zoom region.

17. The system of claim 1, wherein the gain state controls a temperature sensitivity of the thermal camera or an intrascene range of the thermal camera.

18. A computer-implemented method comprising:

obtaining, by a processor from a thermal camera, temperature readings for respective pixels of a plurality of pixels of an image captured by the thermal camera;

determining, by the processor, respective weights for the temperature readings using a weight function, wherein the weight function assigns a weight to a given temperature reading for a given pixel based on a proximity of the given pixel to a maximum-weighted point, and wherein the weight is inversely proportional to a distance between the given pixel and the maximum-weighted point;

determining, by the processor, a weighted average of the temperature readings using the temperature readings and the respective weights for the temperature readings;

determining, by the processor based at least on the weighted average, a gain state for the thermal camera; and causing, by the processor, the thermal camera to operate in the gain state.

19. The method of claim 18, wherein the maximum-weighted point is a center pixel of the plurality of pixels.

20. The method of claim 18, wherein the maximum-weighted point is a center pixel of a region of interest.

21. The method of claim 18, wherein causing the thermal camera to operate in the gain state comprises transmitting a software command to a camera module of the thermal camera, wherein reception of the software command causes the thermal camera to operate in the gain state.

22. A non-transitory computer-readable medium having stored therein instructions that, when executed by a processor, cause the processor to perform functions comprising:

obtaining temperature readings for respective pixels of a plurality of pixels of an image captured by a thermal camera;

determining respective weights for the temperature readings using a weight function, wherein the weight function assigns a weight to a given temperature reading for a given pixel based on a proximity of the given pixel to a maximum-weighted point, and wherein the weight is inversely proportional to a distance between the given pixel and the maximum-weighted point;

determining a weighted average of the temperature readings using the temperature readings and the respective weights;

determining, based at least on the weighted average, a gain state for the thermal camera; and causing the thermal camera to operate in the gain state.

\* \* \* \* \*